March 17, 1953 R. P. RICHMOND 2,631,543
PACKLESS IMPELLER PUMP
Filed July 21, 1948

Robert P. Richmond Inventor
By W. O. T Heilman Attorney

Patented Mar. 17, 1953

2,631,543

UNITED STATES PATENT OFFICE 2,631,543

PACKLESS IMPELLER PUMP

Robert P. Richmond, Baltimore, Md., assignor to Standard Oil Development Company, a corporation of Delaware Application July 21, 1948, Serial No. 39,889

1 Claim. (Cl. 103—87)

The present invention relates to a pump mechanism, and more particularly to one in which the impeller is enclosed in and driven by the rotor of an induction type motor, which rotor is fully enclosed in a casing directly connected in a conduit for fluids, thereby eliminating pump shaft seals and other parts liable to leakage in service.

The invention and its objects may be fully understood from the following description when read in conjunction with the accompanying drawings, in which.

Figure 1:
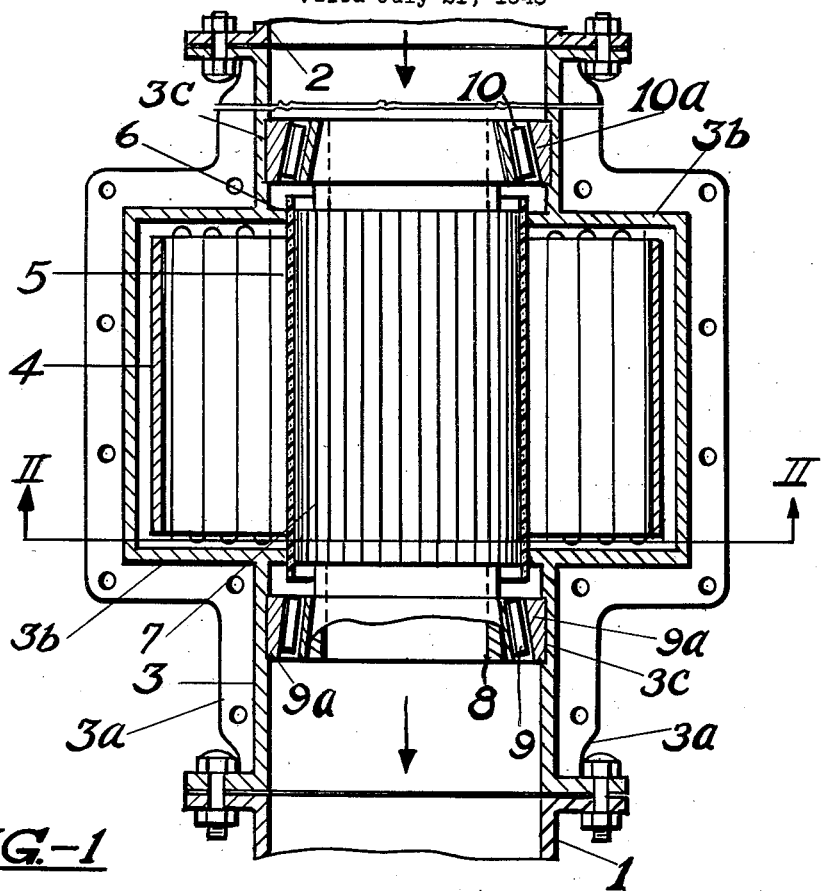
Fig. 1 is a view longitudinally through a structure according to the invention, with parts broken away and shown in section.

As shown in the drawings, the numerals 1 and 2 designate adjoining end portions of a conduit system. The numeral 3 designates a conduit casing element which in the embodiment illustrated also serves as a casing for the pump and motor means. This element is insertable in the conduit line as between end portions 1 and 2. The casing 3 is preferably in two parts, joined by bolts, or otherwise, through flange portions 3a. As shown, the casing 3 is provided with an integral concentric, annular enlarged portion 3b, adapted to accommodate the field element 4 of a multi-phase induction motor, the interior of the portion 3b and the field element 4 being separated and sealed from the interior of the balance of the casing by means of an intermediate casing section, or sleeve element 5 secured to annular flange portions 6 extending inwardly around the juncture of the portion 3b with the balance of the casing element.

Although in the embodiment illustrated, the casing 3 is provided with an enlarged portion 3b with a cylindrical sleeve seal element 5, the portion 3b need not be integral with the balance of the casing, but may be removably secured thereto. Also, the element 5 may be formed as an integral section of the casing rather than being inserted as a separate sleeve. In either event, it is intended that the material of the element 5 be of a material affording substantially slight interference to the flux pattern between the field and rotor. Preferably such element will be formed of a material such as a mica-filled, phenol-furfural synthetic resin, or another similar material which has good electrical insulation properties and is non-interfering with the motor flux pattern.

The rotor element 7 of the induction motor is a cylindrical element carried on a hollow core shaft 8, supported at each end by means of roller bearing members 9 and 10 respectively. As shown, the shaft ends have a generally conical form, tapered in a direction opposite to that of the line of flow through the conduit. The roller bearing members 9 and 10 may be fitted to the flared ends of the shaft 8 and retained thereon in any suitable fashion, and the assembly may be suitably mounted in the casing as by providing annular grooves 3c in the casing walls to receive the outer-ring members 9a and 10a of the bearing raceways.

Figure 2:
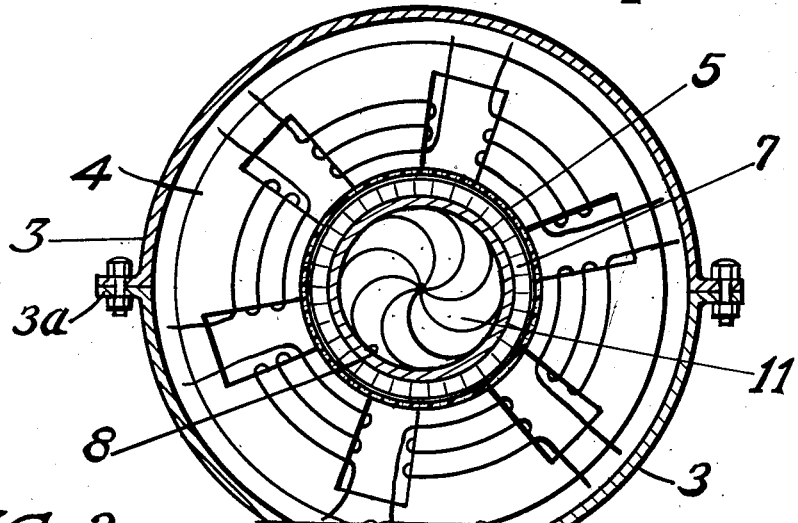
Fig. 2 is a cross-sectional view of the structure along the line II—II of Fig. 1.

As shown in Fig. 2, the hollow core shaft 8 is provided with a propeller type impeller 11 disposed laterally within the shaft. Preferably this impeller member is located equidistant from the ends of the shaft. It may be of the same or similar material as the shaft, or formed of a material such as phenol-formaldehyde type synthetic resin, or any other similar plastic material. Other forms of impellers may be substituted for the propeller type illustrated and described.

The pump which has been described, is particularly adapted to the handling of fluids which present a serious leakage problem, such as highly volatile liquids or liquified normally gaseous fluids, or where the fluid being handled would tend to attack packing materials and shaft seals required by ordinary pumps.

The invention has been illustrated and described with particular reference to a specific embodiment thereof. Various modifications may be made in the embodiment shown and described, for the purpose of illustration only, and it is not intended that the invention be limited thereby, but only by the appended claim.

What is claimed is:

A pump, comprising a conduit casing element, adapted for insertion between adjoining ends of a pair of fluid conduit sections, which element consists of an enlarged annular portion disposed between and integral with opposite coaxial end portions engageable with said conduit sections, and an intermediate cylindrical casing section in fixed relation to said casing annular portion extending between said coaxial end portions, separating and sealing said annular portion from said end portions; a hollow core, shaft member extended coaxially through said intermediate casing section in radially spaced relation thereto, said member terminating at each end within a casing element end portion; a substantially conical bearing surface portion on each end of said shaft, each portion tapered in a direction opposite to flow through said casing element; an annular bearing support for each end of the shaft adapted to receive said bearing surface portion thereof, and each disposed coaxially within a casing end portion; an induction motor field element disposed within said enlarged casing portion exteriorly of said intermediate casing section; a cylindrical, induction motor, rotor element mounted on said shaft interiorly of said intermediate section and within the electrical field of said field element; and a pump impeller member internally of said shaft.

ROBERT P. RICHMOND.

REFERENCES CITED

The following references are of record in the file of this patent:

UNITED STATES PATENTS

| Number | Name | Date |
|---|---|---|
| 1,071,042 | Fuller | Aug. 26, 1913 |
| 1,534,451 | Kauter | Apr. 21, 1925 |
| 2,195,902 | Pezzillo | Apr. 2, 1940 |
| 2,263,719 | Davies | Nov. 25, 1941 |
| 2,406,959 | Millard | Sept. 3, 1946 |
| 2,500,400 | Cogswell | Mar. 14, 1950 |

FOREIGN PATENTS

| Number | Country | Date |
|---|---|---|
| 485,225 | Great Britain | May 17, 1938 |
| 558,624 | France | May 29, 1923 |